(12) United States Patent
Kumar

(10) Patent No.: US 7,876,278 B2
(45) Date of Patent: Jan. 25, 2011

(54) DUAL-FEED ANTENNA

(75) Inventor: Balbir Kumar, Filton (GB)

(73) Assignee: BAE Systems plc, London (GB)

( * ) Notice: Subject to any disclaimer, the term of this patent is extended or adjusted under 35 U.S.C. 154(b) by 2281 days.

(21) Appl. No.: 10/183,066

(22) Filed: Jun. 24, 2002

(65) Prior Publication Data

US 2010/0321260 A1    Dec. 23, 2010

(30) Foreign Application Priority Data

Jun. 26, 2001    (GB) ................................. 0115549.8

(51) Int. Cl.
*H01Q 19/00* (2006.01)
(52) U.S. Cl. ...................... 343/756; 343/758
(58) Field of Classification Search ............ 250/339.01, 250/344; 343/756.757, 758; 333/101, 105, 333/109, 110, 261; 356/153, 4.01–5.15
See application file for complete search history.

(56) References Cited

U.S. PATENT DOCUMENTS

| | | | |
|---|---|---|---|
| 2,981,834 A | 4/1961 | Holloway et al. | |
| 4,319,242 A | 3/1982 | Lewis | |
| 4,561,775 A | * 12/1985 | Patrick et al. | 356/5.04 |
| 5,418,364 A | * 5/1995 | Hale et al. | 250/334 |

FOREIGN PATENT DOCUMENTS

| | | |
|---|---|---|
| DE | 3629315 A1 | 3/1988 |
| EP | 0235932 A1 | 9/1987 |
| WO | WO 94/26001 | 11/1994 |
| WO | WO 02/50950 A1 | 6/2002 |

* cited by examiner

*Primary Examiner*—Isam Alsomiri
(74) *Attorney, Agent, or Firm*—Crowell & Moring LLP

(57) ABSTRACT

The present invention relates to a dual-feed antenna. The invention provides an antenna comprising first and second electromagnetic radiation paths which join to form a common third electromagnetic radiation path, wherein the first path is rotatable with respect to the second path. In this way, two antenna feeds can be directed independently of one another, whilst combining the electromagnetic radiation paths from the antenna feeds then allows a common set of components to be used in signal analysis or generation.

39 Claims, 2 Drawing Sheets

DUAL-FEED ANTENNA

BACKGROUND AND SUMMARY OF THE INVENTION

The present invention relates to a dual-feed antenna.

When a tank is deployed in a battlefield it is desirable for both the commander and the gunner to be able to view potential targets. A commander will survey the battlefield to identify and prioritise targets using a conventional infrared or optical range-finder sight. An antenna usually is aligned with (is a slave to) the inferred or optical range-finder sight. When the commander believes that he has identified a target, he will activate the antenna, and a communication system will confirm whether the target is a "friend" or "foe", and/or to obtain range or other information. The location of the non-"friendly" targets is provided to a target management system which then aims the gun appropriately. Before firing the gun the gunner needs to use an antenna and communication system to verify his or her aim and/or to confirm that the target has been correctly identified and is not a "friendly" target.

If a completely separate antenna and communication system is provided for each of the commander and gunner this increases cost and weight. An alternative system may comprise a single antenna, which is shared by the commander and gunner. The antenna is used most of the time by the commander. The commander uses the antenna to survey the battlefield. Only when the gunner is taking aim and needs to confirm his or her aim and/or the target identity immediately prior to firing the gun will the antenna be moved to align with the gun bore-sight. When the antenna is aligned with the gun bore-sight, and during the time that the antenna is moving from the position chosen by the commander to be aligned with the gun bore-sight, the commander cannot access the communication system. It is desirable to minimise the time that the commander loses his or her access to the communication system, even though in modern systems this time is typically less than one second.

It is an object of the present invention to provide a communication system which allows two antenna feeds to be provided without duplicating the entire communication system.

According to the present invention there is provided an antenna comprising first and second electromagnetic radiation paths which join to form a common third electromagnetic radiation path, wherein the first path is rotatable with respect to the second path. In this way, two antenna feeds can be directed independently of one another, whilst combining the electromagnetic radiation paths from the antenna feeds then allows a common set of components to be used in signal analysis or generation.

Optionally, the first and second paths are independently rotatable about a common axis. This allows a simplified design. The first path may be rotatable in tandem with an infra red or optical sight and, optionally, the second path may be rotatable in tandem with a directional weapon. This would match the requirement for a tank in which a commander uses the infra red or optical sight and a gunner uses the directional weapon.

Preferably, the antenna comprises an electromagnetic radiation modifier operable to modify a property of radiation passing along at least one of the first or second paths. This is a convenient way of rendering radiation following one of the paths distinguishable from radiation following the other path. Conveniently, the modifier may be a polariser operable to change the polarity of radiation passing along at least one of the first or second paths. Advantageously, the antenna comprises first and second polarisers associated with the first and second paths respectively, the first and second polarisers being operable to produce substantially orthogonal linear polarisations of radiation passing along the respective paths. Devices are known, such as polarising filters, for allowing the passage of radiation which is linearly polarised in one direction whilst not allowing the passage of radiation linearly polarised in an orthogonal direction, and this is a convenient way of separating the radiation of the two paths.

Optionally, the antenna further comprises a switch operable selectively to allow radiation from the first and/or second path to pass along the third path. The switch may be sensitive to polarisation direction and/or frequency.

Preferably, the first path includes a first reflector for directing radiation to the third path and, optionally, the second path may include a second reflector for directing radiation to the third path. The first reflector may rotate with the first path or may be fixed in position relative to the first path. Similarly, the second reflector may rotate with the second path or may be fixed in position relative to the second path.

The second reflector may be a wire grid operable to reflect radiation from the second path to the third path and to transmit radiation from the first path to the third path. Conveniently, the wire grid is operable to transmit radiation from the second path when first incident to a third reflector that is operable to reflect radiation back towards the wire grid whereupon the radiation is reflected to the third path. Optionally, the third reflector rotates the polarisation of any instant radiation by 90° upon reflection.

Of course, a single antenna may allow receiving and transmission of radiation along the two paths.

BRIEF DESCRIPTION OF THE DRAWINGS

For a better understanding of the present invention, embodiments will now be described by way of example, with reference to the accompanying drawings, in which.

DETAILED DESCRIPTION OF THE DRAWINGS

Figure 1:
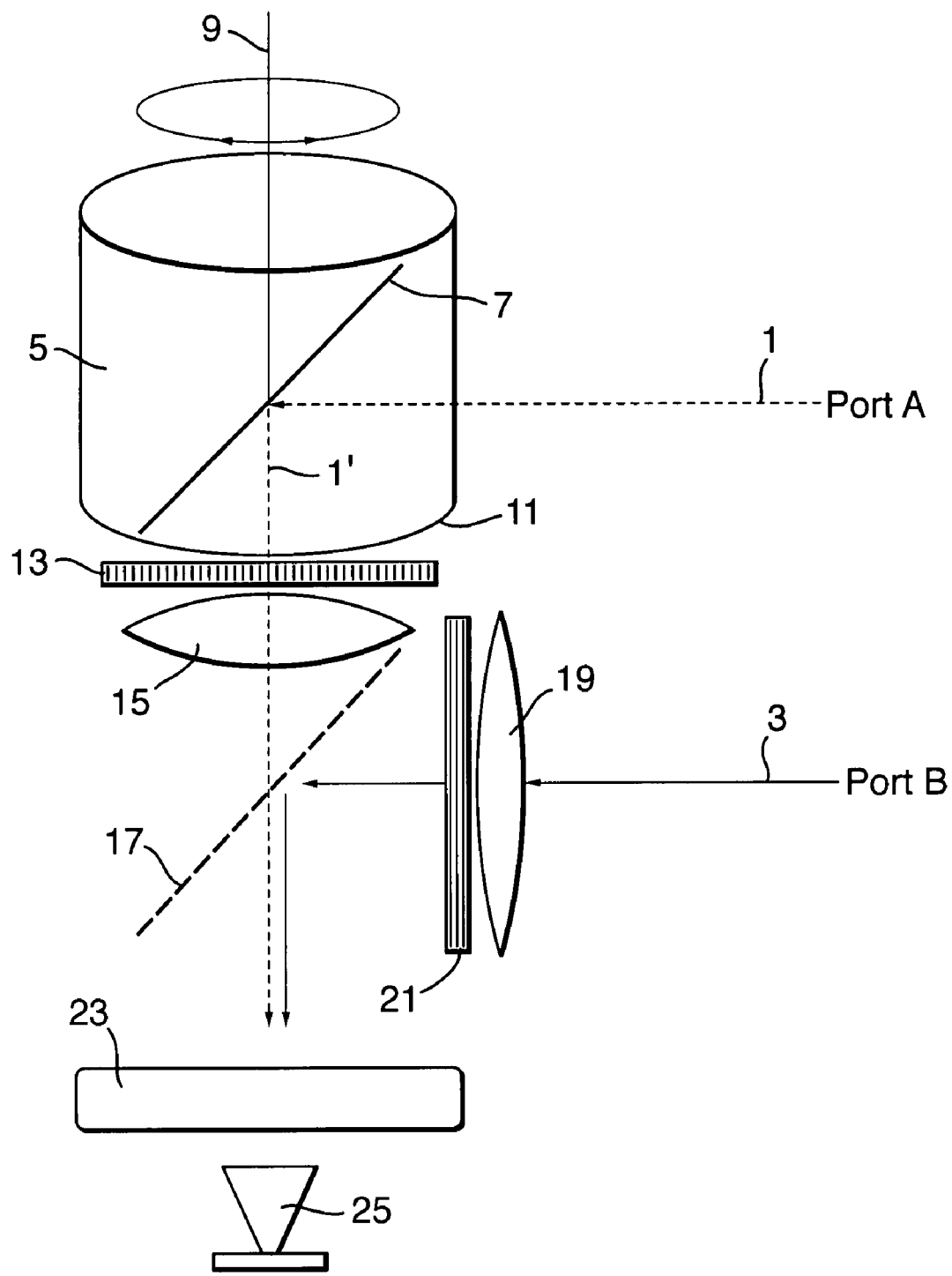
FIG. 1 shows schematically a first embodiment of the dual-feed antenna.

In the respective drawings similar elements are given like reference numerals.

Initially, for the sake of brevity the system is described referring to radiation being received by the system. However, it should be understood that radiation may be both transmitted and received by the system.

Figure 2:
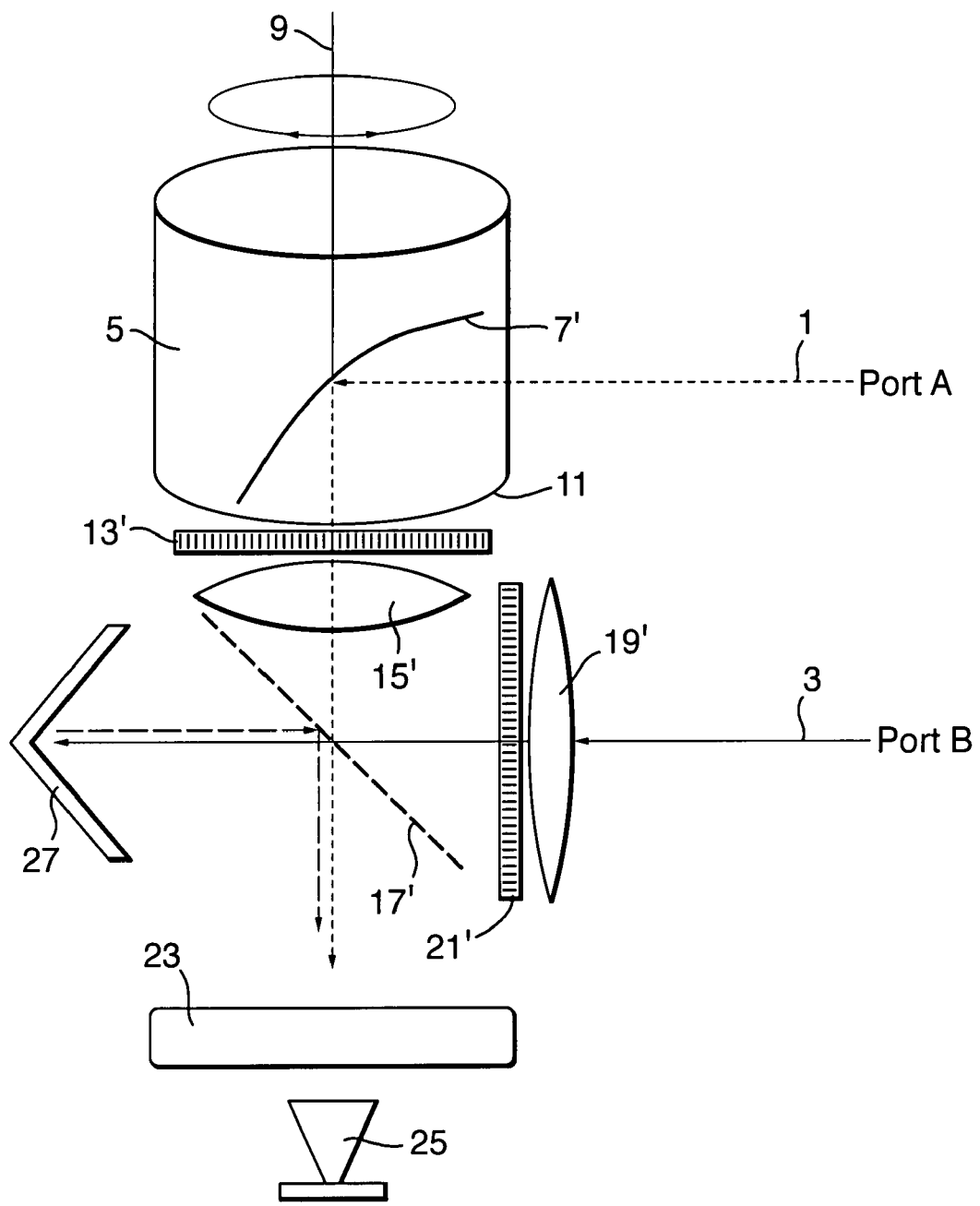
FIG. 2 shows schematically a second embodiment of the dual-feed antenna.

The first embodiment of the antenna system shown in FIG. 1 and the second embodiment of the antenna system shown in FIG. 2 are intended for use, for example, in a tank. Radiation enters the antenna system via a first port 1 and a second port 3. Radiation from the first port 1 enters a cylindrical ray dome 5. The ray dome 5 may be formed of any suitable material, such as a ceramics or low loss plastics material, for example high-density ceramics or polyethylene or rexolite (registered trade mark), and may have an appropriate anti-reflective coating.

Housed within the ray dome 5 is a plane mirror 7. The ray dome 5 and the plane mirror 7 are rotatable together about the axis 9 so that radiation admitted into the first port 1 is from the area of the battlefield of interest to the tank commander. In this case, the ray dome 5 may be opaque apart from the port 1 which must be at least partially transparent. Advantageously, this allows substantially all the ray dome 5 to be made of armour plating. The reflecting surface of the mirror is aligned with (is a slave to) an infrared or optical range finder signal (or the like) used by the commander. Rotation may be facilitated by a stepper motor (not shown) coupled to the ray dome 5.

In an alternative configuration, the ray dome 5 can be fixed in position, with the mirror 7 being rotated within the ray dome 5. In this case, the ray dome 5 needs to be transparent over the line of sight provided by the range of movement of the mirror 7.

Radiation entering the first port 1 is circularly polarised. The plane mirror 7 within the ray dome 5 is inclined at 45° to the axis 9 and to the direction of movement of the incoming radiation. The radiation 1' is reflected from the mirror 7 and travels perpendicularly to its original direction through the base or bottom 11 of the ray dome 5. It should be understood that the ray dome 5 may be in the form of a hollow open-ended cylinder, in which the mirror is fixed. With such an arrangement, the ray dome 5 will have no base as such.

Positioned beneath the base or bottom 11 of the ray dome 5 is a first quarter wave plate 13. The first quarter wave plate 13 changes the polarisation of the radiation 1' from circular polarisation to linear polarisation. The first quarter wave plate 13 may rotate with the mirror 7 to vary the linear polarisation in tandem with rotation of the ray dome 5 or, alternatively, the first quarter wave plate 13 may be fixed in position to give a fixed linear polarisation. The linearly polarised radiation passes from the first quarter wave plate 13 to a convex lens 15, which focuses the incoming radiation 1'. The lens 15 is a plastics lens. Beneath lens 15 is a polariser in the form of a wire grid 17, although other types of polariser may be used as is commonly known in the art. The wire grid 17 is planar and is inclined at 45° to incident radiation. Furthermore, the wire grid 17 is arranged to allow the linearly polarised radiation from the quarter wave plate 13 and lens 15 to pass therethrough.

The path of the radiation through the first port 1 is shown schematically by the dotted line in FIGS. 1 and 2. However, in reality the radiation will be a quasi-optical beam of finite beam weight. Various aspects of quasi-optical systems are described in the book "Millimetre-wave Optics Devices and Systems" by J C Lesurf, published by IoP Publishing.

The path of the radiation through the second port 3 is shown by a solid line in FIGS. 1 and 2. The second port 3 is in fixed alignment with the bore-sight of the gun barrel of the tank, although the elevation of the second port 3 relative to the gun barrel may be varied in some circumstances, as will be described in more detail below. The radiation from the second port 3 passes through second convex lens 19, which focuses the radiation. The focussed radiation then passes through second quarter wave plate 21, where the polarisation of the radiation is changed from circular polarisation to linear polarisation. The orientation of the polarisation is selected to ensure that the radiation emerging from the second quarter wave plate 21 is subsequently reflected by the wire grid 17. Accordingly, the polarisation of the radiation emerging from second quarter wave plate 21 after it has been reflected by the wire grid 17 is orthogonal to the polarisation of the radiation that emerges from the first quarter wave plate 13 and passes through the wire grid 17.

Radiation entering through the first port 1 encounters quarter wave plate 13 before encountering the first lens 15: however, the positions of the quarter wave plate 13 and the first lens 15 can be reversed. Similarly, radiation entering through the second port 3 encounters the second lens 19 before encountering the quarter wave plate 21, although their positions can be reversed.

By allowing radiation from the first quarter wave plate 13 to pass therethrough and by reflecting radiation from the second quarter wave plate 21, the wire grid 17 allows the radiation received through the first port 1 and the second port 3 to follow a common path. The two radiation beams are coincident adjacent parallel beams are shown in the figures only to ease understanding of the invention. This radiation having a common path is incident upon polarisation switch 23. A suitable polarisation switch is described in United Kingdom Patent Publication No. GB-A-2,343,789. As an alternative to the polarisation switch 23, a mechanical waveguide switch or a mechanical polarisation rotation device could be employed. However, the electronic polarisation switch 23 may be preferred because it can operate faster than the other devices.

The polarisation switch 23 can be operated so that it allows only radiation from the first port 1 to pass to feed network 25, or alternatively it can be operated so that it allows only radiation from the second port 3 to pass to the feed network 25. The polarisation switch can select which radiation it allowed to pass therethrough very quickly, in less than a millisecond.

The feed network may be a feed network of a communication system which will transmit a signal to the target. If the target is in fact a "friendly" target, it will transmit back a recognisable (circularly polarised) signal in response to the received signal, and the commander will note that this is not a target to be engaged. If no signal, or an unrecognised signal is returned, this indicates that the target is not a "friendly" target.

The feed network 25 can be a monopulse feed network. A monopulse feed network is one which can obtain angular and range information from a single pulse. A monopulse feed network may be used to improve the angular resolution of the system. In such a system, to achieve the desired angular accuracy, in the azimuth plane, the cross-wires of the commander's sight in the first port 1 must be aligned with the null of the difference channel, and the target viewed through the second port 3 must be in the null of the difference channel, which is aligned with the bore-sight of the gun barrel, prior to the gun being fired. Such a radar system is described in United Kingdom patent publication GB 2314985, and will not be described further here.

Because the polarisation switch 23 can be operated to allow information from either the first port 1 or the second port 3 to pass to the feed network 25, only a single feed network 25 is required despite the antenna system being able to receive radiation from two ports 1 and 3. This saves duplicating the components of the feed network 25, reducing cost and weight.

In use, when the tank in which the antenna system is employed enters the battlefield the commander will wish to survey the battlefield to identify potential targets using an infrared or optical sight. These targets could typically be seven or eight kilometers away and are often difficult to identify. When the commander believes that he has identified a target, he will activate the communication system and obtain an indication as to whether the target is a "friend" or "foe", and possibly also range information. The location of the targets is provided to a target management system which will aim the gun at each of the targets in turn. However, immediately before firing, the polarisation switch 23 is operated so that radiation from the second port 3 is passed to the feed network 25 via the polarisation switch 23. The gunner can then independently verify the identity of the target using the communication system to confirm that it is not in fact a "friendly" target. The gun is then fired and the polarisation switch 23 is again operated to provide information from the feed network 25 to the commander. The commander loses access to the communication system while the polarisation switch 23 is operated to allow radiation from the second port 3 to reach the feed network 25. This time period consists of the processing time of the communication system (including the time taken to obtain a response from the target) and the time taken for the operation of the polarisation switch 23. The polarisation switch 23 operates faster than the antenna can move in the previously mentioned arrangement where the antenna alignment is changed, reducing the duration of the loss of the commander's view.

The second port 3 is always aligned in the azimuth direction with the bore-sight of the gun barrel, as this is the gunner's direction of interest. In contrast, the commander will wish to survey the entire battlefield, hence the first port 1 is independently rotatable azimuthally (i.e. about the axis 9) relative to the gun barrel. As will be described later, there may be some freedom of rotation of the line of sight in elevation.

The frequency of the radiation employed in the system is advantageously of between 30 and 300 GHz, the part of the spectrum referred to as the millimeter wave range, although the microwave range of the spectrum (1 to 30 GHz) could be used.

It is possible to eliminate the polarisation switch 23, or the corresponding mechanical wave-guide switch or mechanical polarisation rotation device, if the feed network 25 is provided with a dual polar feed horn with a first port which transmits only radiation having a first linear polarisation corresponding to radiation derived from the first port 1, and a second port which transmits only linearly polarised radiation having a second polarisation direction corresponding to that derived from the second port 3.

An external microwave integrated circuit (MIC) incorporating a switch such as a p-i-n diode can be used to direct signals from/to any of the ports to a single transmitter/receiver. This switching operates very quickly, and takes of the order of 10 ns.

Although the arrangement described above refers to radiation being received from the first and second ports 1 and 3, the system will also can be operated in a transmission mode, in which the electromagnetic radiation will follow the same paths in reverse.

FIG. 2 shows a second embodiment of the present invention which incorporates lenses 15' and 19' of longer focal length and higher gain. The mirror 7' located in the ray dome 5 is concave. The provision of a concave mirror 7' allows the distance to the feed network 25 to be increased, allowing the incorporation of a larger antenna which can have a larger gain and a narrower beam width. As the paths on the first 1 and second 3 ports to the feed network 25 must be of the same length, a reflector 27 is provided behind the second lens 19'. The reflector 27 increases the path length to the feed network 25. The second quarter wave plate 21' in the second embodiment has the same configuration as the first quarter wave plate 13, thereby providing the radiation received through the second port 3 with the same linear polarisation direction as that received through the first port 1. The wire grid 17' in the second embodiment has a different orientation to that in the first embodiment. The wire grid 17' is inclined at 135° to the direction of travel of the incident radiation. The radiation passing through the first quarter wave plate 13 and the second quarter wave plate 21' passes through the wire grid 17'. Radiation passing through the first quarter wave plate 13 (shown by the dotted lines) passes to the polarisation switch 23. The radiation from the second quarter wave plate 21' is incident on the reflector 27 (this radiation is shown by the solid line). Radiation reflected from the reflector 27 (shown by the dashed lines) has its polarisation rotated through 90° by the reflector 27. When the radiation reaches the wire grid 17' for the second time it is reflected by the wire grid 17' due to its changed polarisation. The reflected radiation passes to the polarisation switch 23.

If the "friendly" targets are configured to transmit/receive linearly polarised signals (rather than circularly polarised signals), the system of the first embodiment described with reference to FIG. 1 or of the second embodiment described with reference to the FIG. 2 can be reconfigured to transmit/receive linearly polarised signals. This may be achieved by moving the second quarter wave plate 21, 21' from the positions indicated in FIGS. 1 and 2 respectively and by placing it above the first quarter wave plate 13, 13'. The second quarter wave plate 21, 21' should rotate with the mirror 7, 7' as the commander views the battlefield whilst the first quarter wave plate 13, 13' remains fixed in alignment such that the linearly polarised signal emerging from it passes through the wire grid 17, 17'. The second quarter wave plate 21, 21' is aligned so as to convert the linearly polarised signal from the first port 1 to a circularly polarised signal (the rotation of the mirror 7, 7' will have no effect on the circularly polarised signal emerging from the second quarter wave plate 21, 21' because this quarter wave plate 21, 21' and the mirror 7, 7' rotate together). Subsequently the first quarter wave plate 13, 13' will convert the signal back to a linearly polarised signal which can then pass through the wire grid 17, 17'.

As briefly mentioned above, there may be some freedom of movement in elevation of the line of sight. As the beamwidth of the microwave antenna is far less then the resolution of the infrared or optical range-finder sight (due to the difference in the wavelength), slight misalignment with the target in elevation can be tolerated, e.g. when the platform is on a small incline or decline. However, if the platform is on a moderate to large incline or decline, then the mirror 7, 7' will need to be tilted in the elevation plane to compensate for misalignment with the target in elevation. The mirror 7, 7' may be tilted in any number of manners commonly used in the art, e.g. about a central shaft using a servo, the tilt being arranged to be through at least part of the elevation plane. Movements in both angular directions (i.e. azimuth and elevation) are slaves to the commander's infrared or optical range-finder sight. The exact values of the azimuthal rotation and elevation can be obtained by incorporating optical angular encoders and/or shaft encoders, as employed in the commanders infrared or optical range-finder sight, to compensate for any error in the movement of the mirror servos.

The wire grid 17, 17' may also require some small elevation correction to compensate for the effect of gravity and the atmosphere. The wire grid frame (not shown) can also be constructed such that it can be tilted, using servos, to allow for a small amount of scanning in elevation, controlled by the target management system.

It should be understood that the present invention is not restricted to the application described above. For example, the antenna system could be used in a battlefield communications system where the commander might scan the battlefield to identify transmitters with which he may wish to communicate. The location of these transmitters can be passed to the communication system operator (who will replace the gunner described above). When the communications system operator wishes to communicate with a target the polarisation switch 23 will be operated so that the feed network 25 receives (or transmits) radiation through the second port 3. When this communication is finished, the polarisation switch is again operated so that the radiation passing to the feed network is derived from the first port 1.

The communication system could be used to relay signals from one tank to another, for example when the tanks are too far apart for reliable direct communication therebetween. In this arrangement the first port 1 is directed to one of the tanks, and the second port 3 is directed to the other tank. Here, the feed network 25 could be configured to receive a signal from one port, amplify it, and retransmit it through the other port. The reception and retransmission can occur simultaneously using an additional external MIC circuit.

The embodiments employ radiation beams with particular polarisation directions so that the beams are distinguishable from one another. Alternatively, the beams could have different frequencies. The wire grid 17 of the embodiments will be replaced with a frequency selective device. This device will control which radiation is passed to the feed network 25.

Although the description discussed the invention in relation to tanks in a battlefield environment, the invention has application in many other situations, e.g. for aircraft in flight or for communication on an aircraft carrier flight deck.

The invention claimed is:

1. An antenna comprising first and second electromagnetic radiation paths which join to form a common third electromagnetic radiation path, wherein the first path is rotatable with respect to the second path.

2. An antenna according to claim 1, wherein the first and second paths are independently rotatable about a common axis.

3. An antenna according to claim 2, wherein the first path is rotatable in tandem with an infra red or optical sight.

4. An antenna according to claim 3, wherein the second path is rotatable in tandem with a directional weapon.

5. An antenna according to claim 3, comprising an electromagnetic radiation modifier operable to modify a property of radiation passing along at least one of the first or second paths.

6. An antenna according to claim 3, further comprising a switch operable selectively to allow radiation from the first and/or second path to pass along the third path.

7. An antenna according to claim 3, wherein the first path includes a first reflector for directing radiation to the third path.

8. An antenna according to claim 2, wherein the second path is rotatable in tandem with a directional weapon.

9. An antenna according to claim 8, comprising an electromagnetic radiation modifier operable to modify a property of radiation passing along at least one of the first or second paths.

10. An antenna according to claim 8, further comprising a switch operable selectively to allow radiation from the first and/or second path to pass along the third path.

11. An antenna according to claim 8, wherein the first path includes a first reflector for directing radiation to the third path.

12. An antenna according to claim 2, comprising an electromagnetic radiation modifier operable to modify a property of radiation passing along at least one of the first or second paths.

13. An antenna according to claim 2, further comprising a switch operable selectively to allow radiation from the first and/or second path to pass along the third path.

14. An antenna according to claim 2, wherein the first path includes a first reflector for directing radiation to the third path.

15. An antenna according to claim 1, comprising an electromagnetic radiation modifier operable to modify a property of radiation passing along at least one of the first or second paths.

16. An antenna according to claim 15, wherein the modifier comprises a first polariser operable to change the polarity of radiation passing along the first path.

17. An antenna according to claim 16, wherein the modifier further comprises a second polariser operable to change the polarity of radiation passing along the first path, the first and second polarisers being rotatable with respect to one another.

18. An antenna according to claim 17 wherein at least one of said polarisers is associated with each of the first and second paths, the polarisers being operable to produce substantially orthogonal linear polarizations of radiation passing along the first and second paths.

19. An antenna according to claim 17, further comprising a switch operable selectively to allow radiation from the first and/or second path to pass along the third path.

20. An antenna according to claim 17, wherein the first path includes a first reflector for directing radiation to the third path.

21. An antenna according to claim 16, wherein said first polariser is one of a plurality of polarisers, and wherein at least one of said polarisers is associated with each of the first and second paths, the polarisers being operable to produce substantially orthogonal linear polarisations of radiation passing along the first and second paths.

22. An antenna according to claim 21, further comprising a switch operable selectively to allow radiation from the first and/or second path to pass along the third path.

23. An antenna according to claim 21, wherein the first path includes a first reflector for directing radiation to the third path.

24. An antenna according to claim 16, further comprising a switch operable selectively to allow radiation from the first and/or second path to pass along the third path.

25. An antenna according to claim 16, wherein the first path includes a first reflector for directing radiation to the third path.

26. An antenna according to claim 15, further comprising a switch operable selectively to allow radiation from the first and/or second path to pass along the third path.

27. An antenna according to claim 15, wherein the first path includes a first reflector for directing radiation to the third path.

28. An antenna according to claim 1, further comprising a switch operable selectively to allow radiation from the first and/or second path to pass along the third path.

29. An antenna according to claim 28, wherein the switch is sensitive to polarisation direction.

30. An antenna according to claim 29, wherein the switch is sensitive to frequency.

31. An antenna according to claim 29, wherein the first path includes a first reflector for directing radiation to the third path.

32. An antenna according to claim 28, wherein the switch is sensitive to frequency.

33. An antenna according to claim 32, wherein the first path includes a first reflector for directing radiation to the third path.

34. An antenna according to claim 28, wherein the first path includes a first reflector for directing radiation to the third path.

35. An antenna according to claim 1, wherein the first path includes a first reflector for directing radiation to the third path.

36. An antenna according to claim 35, wherein the second path includes a second reflector for directing radiation to the third path.

37. An antenna according to claim 36, wherein the second reflector is a wire grid operable to reflect radiation from the second path to the third path and to transmit radiation from the first path to the third path.

38. An antenna according to claim 37, wherein the wire grid is operable to transmit radiation from the second path when first incident to a third reflector that is operable to reflect radiation back towards the wire grid whereupon the radiation is reflected to the third path.

39. An antenna according to claim 38, wherein the third reflector rotates the polarisation of any incident radiation by 90° upon reflection.

* * * * *